(12) United States Patent
Seppä et al.

(10) Patent No.: US 6,630,657 B1
(45) Date of Patent: Oct. 7, 2003

(54) METHOD AND SYSTEM FOR ELECTRICALLY CONTROLLING THE SPACING BETWEEN MICROMECHANICAL ELECTRODES

(75) Inventors: Heikki Seppä, Helsinki (FI); Aarne Oja, Espoo (FI)

(73) Assignee: Valtion teknillinen tutkimuskeskus (FI)

( * ) Notice: Subject to any disclaimer, the term of this patent is extended or adjusted under 35 U.S.C. 154(b) by 0 days.

(21) Appl. No.: 09/720,121

(22) PCT Filed: Jun. 18, 1999

(86) PCT No.: PCT/FI99/00537
§ 371 (c)(1),
(2), (4) Date: Dec. 21, 2000

(87) PCT Pub. No.: WO99/67692
PCT Pub. Date: Dec. 29, 1999

(30) Foreign Application Priority Data

Jun. 24, 1998 (FI) .................................................. 981456
Dec. 30, 1998 (FI) .................................................. 982831

(51) Int. Cl.⁷ ................................................. H01J 40/14
(52) U.S. Cl. .................... 250/221; 250/559.26; 361/278
(58) Field of Search .......................... 250/221, 559.26, 250/559.39, 201.1, 214 R; 356/634–636; 361/115, 277, 278, 280, 283.3

(56) References Cited

U.S. PATENT DOCUMENTS

| | | | |
|---|---|---|---|
| 5,331,852 A | | 7/1994 | Greiff et al. |
| 5,731,703 A | * | 3/1998 | Bernstein et al. ............ 324/256 |
| 6,078,395 A | * | 6/2000 | Jourdain et al. ............ 356/519 |
| 6,496,348 B2 | * | 12/2002 | McIntosh .................... 361/115 |

FOREIGN PATENT DOCUMENTS

| | | |
|---|---|---|
| EP | 0693683 | 1/1996 |
| WO | 9814804 | 4/1998 |

* cited by examiner

*Primary Examiner*—Que T. Le
(74) *Attorney, Agent, or Firm*—Birch, Stewart, Kolasch & Birch, LLP

(57) ABSTRACT

The invention relates to a method for controlling by electrical means the interelectrode distance of such a micromechanical electrode structure [(7,8)] in which at least one electrode [(7)] is attached elastically suspended on the surrounding structure, whereby the elastic properties of each electrode and the electrical control applied over the electrodes determine the interelectrode distance. According to the invention, the distance between the electrodes [(7,8)] is controlled by controlling the AC control current passing via the electrodes [(7,8)].

13 Claims, 3 Drawing Sheets

… …

METHOD AND SYSTEM FOR ELECTRICALLY CONTROLLING THE SPACING BETWEEN MICROMECHANICAL ELECTRODES

This application is the national phase under 35 U.S.C. §371 of PCT International Application No. PCT/FI99/00537 which has an International filing date of Jun. 18, 1999, which designated the United States of America.

The present invention relates to a method [according to the preamble of claim 1] for controlling the interelectrode distance of micromechanical components by electrical means.

The invention also concerns a system for controlling the interelectrode distance of micromechanical components.

BACKGROUND OF THE INVENTION

In many types of micromechanical components and sensors implemented by silicon techniques, a vital part is formed by an electrode structure comprising two, typically planar electrodes whose interelectrode distance is arranged variable by means of an electrostatic force. Generally, the interelectrode distance has been varied by controlling the AC or DC voltage applied over the electrodes. Herein, the control range of interelectrode distance is limited by the so-called pull-in voltage $U_{pi}$. When the control voltage exceeds this value, the electrodes will hit each other under the electrostatic force pulling them together.

In the art are known methods based on driving the interelectrode distance of a moving electrode capacitor by means of controlling the DC charge imposed over the electrodes. Although this technique is capable of reducing the risk of electrode pull-in, a practicable construction thereof requires a galvanic contact to the electrodes.

It is an object of the present invention to overcome the disadvantages of the above-described techniques and to provide an entirely novel method for electrical control of interelectrode distance in micromechanically fabricated electrode structures.

The goal of the invention is achieved by virtue of controlling the interelectrode distance by virtue of controlling the level of AC current passed through the electrodes.

The invention offers significant benefits.

In addition to offering an efficient method of controlling the interelectrode distance without a risk of electrode pull-in, the novel control technique can be implemented in a capacitive or inductive manner without a galvanic contact. Particularly in silicon micromechanical constructions, this control technique can provide significant benefits, since the fabrication of any galvanic control signal contacts to electrodes tends to complicate a micromechanical construction beyond the limits of acceptable production cost efficiency.

Advantageous applications of the invention can be found in new silicon micromechanical voltage transfer standards and Fabry-Perot interferometers in which the control span of the interelectrode distance can be increased up to three-fold as compared to the conventional voltage control technique.

Moreover, embodiments of the invention equipped with tuned circuits according to the invention can offer a significantly boost toward a high efficiency of control.

BRIEF DESCRIPTION OF THE DRAWINGS

In the following, the invention will be examined in greater detail with the help of exemplifying embodiments illustrated in the appended drawings, in which.

SUMMARY OF THE INVENTION

Figure 1:
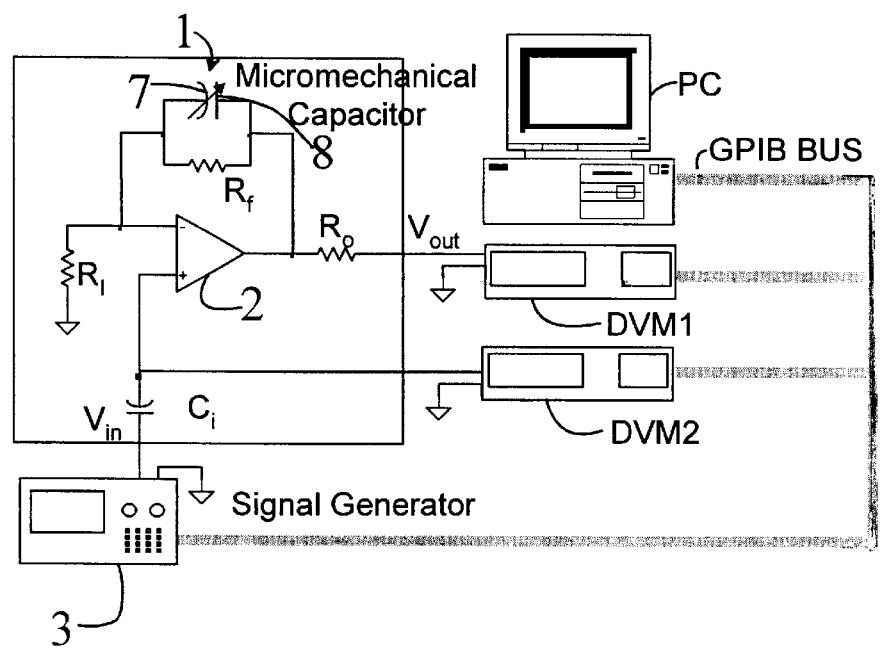
FIG. 1 shows the block diagram of an AC current control circuit configuration according to the invention.

In short, the invention relates to a method for controlling the interelectrode distance in a moving-electrode capacitor. The invention may also be applied to micromechanical alternating-current transfer standards suited for use in miniature and cost-efficient constructions of precision electronics.

In an ideal moving-plate capacitor (MPC) having planar electrodes, the capacitance is $C=\epsilon A/(d-x)$, where x is deviation of the moving electrode (ME) from its static position under electrostatic forces and (d−x) is the interelectrode distance. The displacement of the moving electrode ME is determined by the equation of a forced harmonic oscillator:

$$m\frac{d^2x}{dt^2} + \lambda\frac{dx}{dt} + kx = F_{el}, \qquad (1)$$

written using the symbols according to the standard convention of physics. If a sinusoidal current $i=\hat{i}_0\sin\omega t$ is passed via a capacitor, the charge of the capacitor is $q=(\hat{i}_0/\omega)(1-\cos\omega)+q_0$, where $q_0$ is the capacitor charge at instant t=0. The electrostatic force between the planar electrodes is $F_{el}=q^2/(2\epsilon A)$. Then, the exact steady-state solution of Eq. (1) is $$x = \frac{q_\omega^2}{2\epsilon A k}[1 + A(2\omega)\cos 2\omega t + B(2\omega)\sin 2\omega t], \qquad (2)$$

where $$A^{-1}(\omega) = \frac{(\delta^2-1)^2 - (\lambda/m\omega_0)^2\delta^2}{\delta^2-1} \approx \delta^2,$$

$B^{-1}(\omega)=Q_m(1-\delta^2)^2/\delta+Q_m^{-1}\delta\approx Q_m\delta^3$, and $q_\omega=\hat{i}_0/\sqrt{2}\omega, \omega_0=\sqrt{k/m}, Q_m=\sqrt{km}/\lambda$ and $\delta=\omega/\omega_0$.

Herein, an assumption has been made that $$q_0=-\sqrt{2}q_\omega,$$

whereby the average electrostatic energy stored in the capacitor is minimized so that the DC voltage component over the capacitor is zero. Herein, the terms containing $A(\omega)$ and $B(\omega)$ can be neglected provided that the frequency ω of the alternating control current is substantially high in regard to the mechanical resonant frequency $\omega_0$ of the capacitor, in other words meaning that $\delta \gg 1$, a condition called later in the text as a high operating frequency assumption.

Then, the pseudostatic value of the electrostatic force is $$F_{el}=q_\omega^2/(2\epsilon A), \qquad (2a)$$

and the interelectrode distance is $$x = q_\omega^2/(2\epsilon Ak). \tag{2b}$$

While $F_{el}$ is not related to the interelectrode distance in a current-controlled capacitor the value of $F_{el}$ in a voltage-controlled capacitor increases drastically as the inter electrode distance closes to zero thus causing the pull-in effect of the opposed electrodes.

The amplitude of the AC voltage over the capacitor is $$\hat{u}_\omega = \frac{\sqrt{2}\,q_\omega}{C_0}\left[1 - \frac{4}{27}\left(\frac{q_\omega}{C_0 u_{pi}}\right)^2\right], \tag{3}$$

where $C_0 = \epsilon A/d$ and $$u_{pi}^2 = \frac{8}{27}kd^2/C_0.$$

From Eq. (3) can be seen that the amplitude $\hat{u}$, has a maximum value $\hat{u}_{max} = \sqrt{2}u_{pi}$ when $$q_\omega = q_{max} = \pm\frac{3}{2}C_0 u_{pi}.$$

This characteristic amplitude value $\hat{u}_{max}$ can be used as a reference voltage, because a change in the value of $\hat{i}_0$ does not have a first-degree effect on the value of $\hat{u}_{max}$. If the amplitude inaccuracy of the current causing the voltage is $\Delta\hat{i}_0$, the relative inaccuracy of the voltage at its maximum value is $$\Delta\hat{u}_\omega/\hat{u}_\omega \approx \frac{3}{2}(\Delta\hat{i}_0/\hat{i})^2.$$

To verify these relationships, also the effect of stray capacitance and spectral purity of current source waveform have been investigated by the inventors using numerical simulations.

DETAILED DESCRIPTION OF THE INVENTION

In preliminary tests, measurements were performed using an AC current control system illustrated in FIG. 1, wherein the planar capacitor 1 was fabricated using surface micromechanical techniques. The tested capacitive sensor comprises a moving electrode 7 and a stationary electrode 8. An operational amplifier 2 was used as a voltage-to-current converter. The AC current to the capacitor 1 was supplied by a signal generator 3, whose output voltage was converted by a current-to-voltage converter 2 into an AC current control signal. In the actual circuit configuration, the AC current control of the sensor 1 was implemented by placing the sensor 1 on the feedback path of the current-to-voltage converter 2. The exemplifying component values in the circuit configuration of FIG. 1 were: $R_f = 22$ Mohm, $R_i = 10$ kohm, $R_0 = 100$ ohm and $C_f = 100$ nF. The current passing through the capacitor 1 was estimated as $\hat{i}_0 = \hat{V}_{in}/R_f$ and the voltage over the capacitor 1 as $(\hat{V}_{out} - \hat{V}_{in})$. The measurements were performed by measuring the values of $\hat{V}_{in}$ and $\hat{V}_{out}$ when $\hat{V}_{in}$ was increased slowly.

Figure 2:
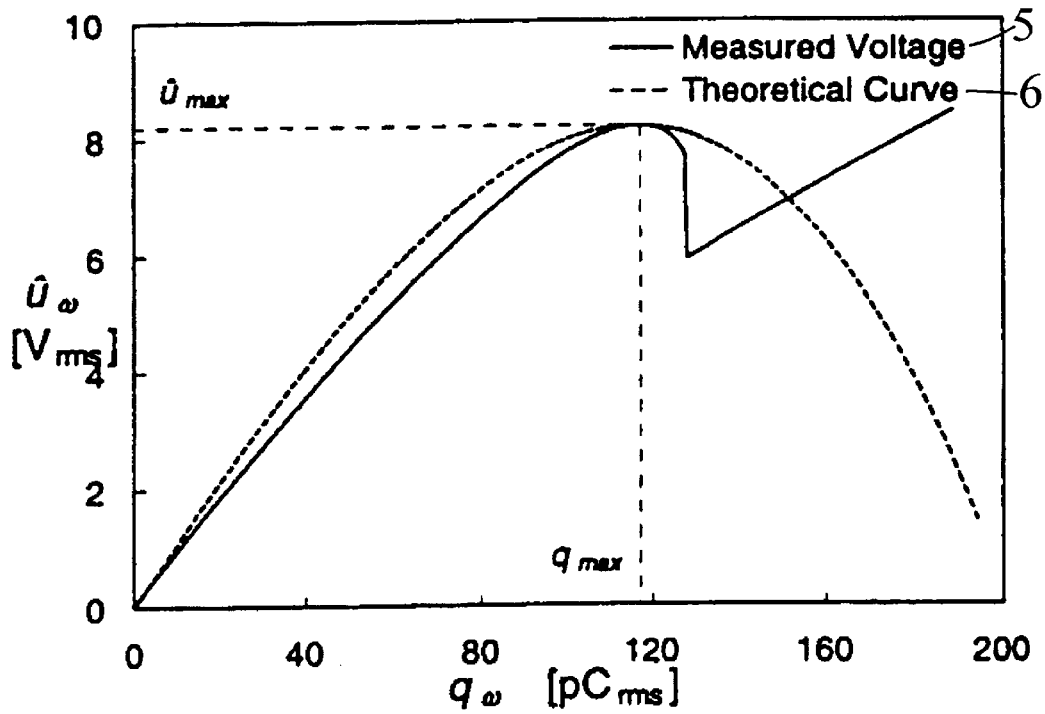
FIG. 2 shows a plot of the capacitor voltage-charge characteristic as measured in the circuit configuration of FIG. 1.

In curve 5 of FIG. 2 is shown a plot of the voltage measured over the capacitor 1 of the circuit shown in FIG. 1 as a function of $q_\omega$. Furthermore, in curve 6 of FIG. 2 is shown with a dashed line the voltage theoretically computed from Eq. 3. Curve 5 representing the measured voltage exhibits a sudden dip at $q_\omega \approx 130$ pC (rms), caused by the tendency of the planar capacitor electrodes 7 and 8 to pull in until they hit the spacers made in the interelectrode space. This pull-in effect is a result of the sensor stray capacitance and the nonzero condition of DC voltage over the capacitor. In order to cope with these anomalies resulting from the nonideal behaviour of the capacitor, the horizontal and vertical axes of the theoretically computed curve are scaled with correction factors having values of 0.95 and 0.80, respectively. In a static situation, the force imposed by the DC charge on the moving electrode ME is $$F_{el} = \frac{1}{2}\epsilon Au^2/(d-x)^2 = q^2/2\epsilon A,$$

whereby it can be computed from the equation of an equilibrium situation $$u^2 = \frac{2k}{C_0}dx(1-x/d)^2. \tag{4}$$

that the DC voltage u over the capacitor attains a maximum value $u = u_{pi}$ when $x = d/3$.

On the same principle, it is also possible to realize DC and AC voltage transfer standards based on the shift of the mechanical resonant frequency of micromechanical oscillators having a high Q value.

In the present application, the term AC current is used when reference is made generally to a cyclic alternating-current waveform having a frequency typically selected to be substantially higher than the effective mechanical resonant frequency of the capacitive electrode structure. Herein, the term effective resonant frequency is preferredly used inasmuch the inherent mechanical resonant frequency of the electrode construction can be varied by means of, e.g., a DC control voltage applied between the electrodes.

In a plurality of applications, it is advantageous to make the values of $F_{el}$ and $q_\omega = i_\omega/\omega$ computed from Eq. (2a) dependent on the interelectrode distance in a manner that aids the stabilization of the desired interelectrode distance. This goal can be attained by means of a resonant-tuned AC current control circuit.

Figure 3:
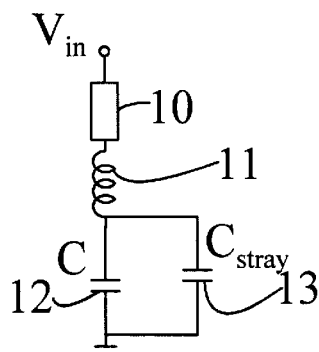
FIG. 3 shows a circuit configuration particularly suited for use in the method according to the invention.

Referring to FIG. 3, the circuit shown therein may be tuned to the resonant frequency of the control system, whereby the interelectrode distance can be controlled using minimal control energy. As shown in the diagram, an inductor 11 and a capacitor 12 are connected in series and tuned to resonance by a suitably selected inductance value of the inductor 11. In the diagram, the circuit element 10 represents the series resistance of the inductor 11, while the circuit element 13 represents the stray capacitance of the capacitor 12.

If the Q value of the resonant circuit is made high, very low values of the AC control voltage $V_{in}$ are sufficient to create an electrostatic force which is dependent on the alternating control current passed via the electrodes. This is because a tuned circuit has an inherent property contributing to easier control of the interelectrode distance, namely, the electrostatic force acting between the electrodes is highest when the interelectrode distance and, hence, the capacitance determined by said distance is modulated so that the effective resonant frequency of the structure is equal to the frequency of the applied alternating control current. Resultingly, the interelectrode distance can be altered by controlling the frequency of the control current.

Assuming the high operating frequency condition, the effective value of the control voltage applied over the electrodes is $$\hat{u}_\omega = V_{inRMS}/\sqrt{\omega^{2R^2C^2_t(\omega-\cdot)}},$$

where $C_t = C + C_{stray}$. Then, the electrostatic force between the electrodes is $$\frac{F_{el}}{kd} = \frac{4V^2_{inRMS}C^2}{27u^2_{pi}C^2_0} \times \frac{1}{\omega^2 R^2 C^2_t + (\omega^2 LC_t - 1)^2},$$

whereby the electrical resonant frequency is $\omega_e = \sqrt{C_0/C_t}\omega_0$, where $\omega_0 = \sqrt{1/LC_0}$. At resonance, the quality factor is $Q_e = Q_0 \sqrt{C_0/C_t}$, where $Q_0 = \sqrt{L/R^2C_0}$.

Figure 4:
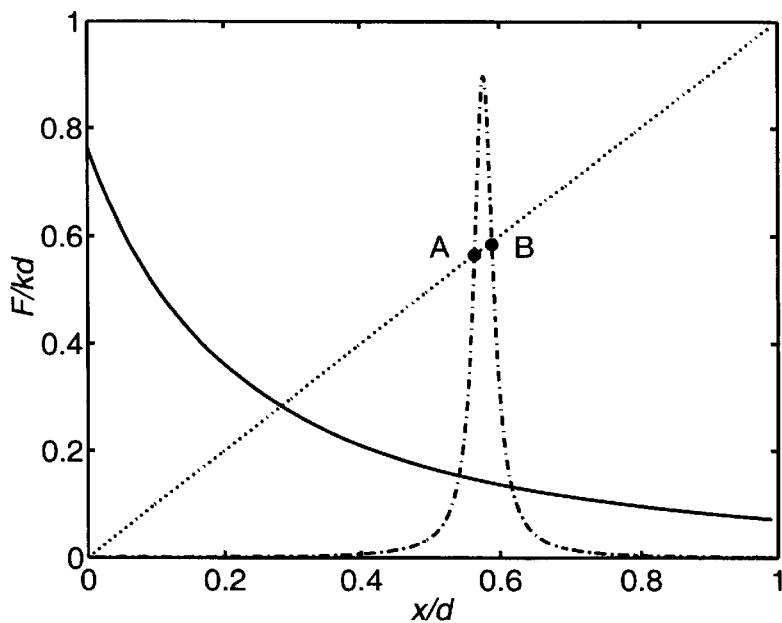
FIG. 4 shows a plot of interelectrode forces as a function of capacitor plate deviation.

Referring to FIG. 4, therein are plotted the forces acting on the electrode of a moving electrode capacitor in a pseudostatic situation. The curves are computed using the parameter values $C_{stray} = 0$ and $Q_0 = 40$. Using conventional circuit analysis techniques, it can be seen that when $\omega/\omega_0 = 0.65$ ($V_{inRMS} = 0.04u_{pi}$), the solutions plotted in the diagram are stable for $x = x_A$, while the intersection point $x = x_A$ represents an unstable solution. When $\omega/\omega_0 = 1.2$ ($V_{inRMS} = u_{pi}$), there is only one pseudostatic solution that is stable. Herefrom, it is easy to see that the electrical resonant frequency of a current drive circuit for a moving-plate capacitor operating in a stable working point must be lower than the actual drive frequency. On the basis of the above treatise, it is obvious that when $\omega/\omega_0 > 1$, a desired interelectrode distance x in the range $0 \leq x \leq 1$ can be set by controlling the voltage $V_{in}$. Besides in the ideal case when $C_{stray} = 0$, this is also true for cases where $C_{stray}$ is not very large in respect to $C_0$.

In addition to the control of electrode movement, the interelectrode distance control based on operation essentially close to the resonant frequency of tuned drive circuit may also advantageously be used for clamping electrode movement in a force-balanced configuration. Thus, it is possible to compensate for the force imposed by a pressure differential, for instance, over an electrode acting as the sensor diaphragm.

If the interelectrode distance control is implemented using a resonant circuit tuned to a frequency higher than the mechanical resonant frequency of the electrode system, a situation is created in which the change of the interelectrode distance is an almost linear function of the control voltage over a large control range. Herein, the electrical resonant frequency of the current drive circuit of the moving-electrode must again be set lower than the actual drive frequency in order to obtain a stable working point.

When the circuit shown in FIG. 3 is operated in resonance, the force $F_{el}$ is multiplied by a factor $Q^2$. By virtue of this phenomenon, large electrostatic forces can be generated using minimal drive voltages.

Figure 5:
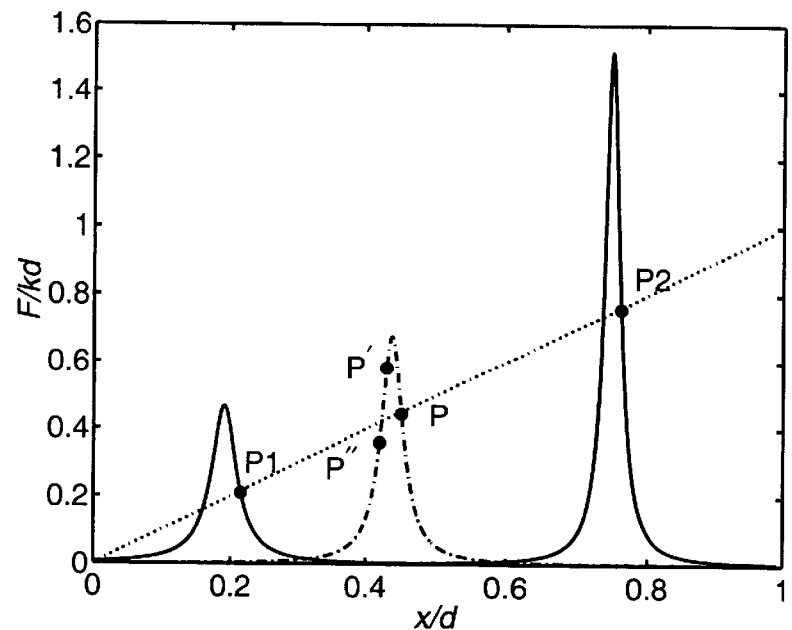
FIG. 5 shows a plot of interelectrode forces in a frequency-control-based embodiment according to the invention.

In FIG. 5 is shown a configuration suitable for using a constant-amplitude drive voltage whose frequency is controlled so that the circuit operation is all the time confined to within the limits of the resonant frequency curve of the resonant circuit of FIG. 3 whereby a small control voltage can be used to achieve the maximal value of electrostatic force between electrodes 7 and 8 of the force transducer 1.

Figure 6:
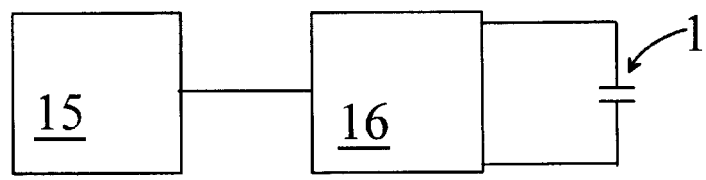
FIG. 6 shows the block diagram of a control system according to the invention.

Referring to FIG. 6, therein is illustrated the basic concept of the invention for configuring a system in which the signal of an alternating current source 15 is converted in a converter 16 such that the interelectrode force, which under the control of a conventional voltage control system behaves as a force inversely proportional to the square of the distance between the electrodes thus readily causing a pull-in effect on the electrodes of a sensor 1, is converted in said converter into an alternating control current which is not dependent on the interelectrode distance and thus is not subject to the pull-in effect between the electrodes. Alternatively, the converter 16 can be replaced by a tuned resonant circuit shown in FIG. 3 or even using a more complicated tunable circuit, whereby a conventional voltage control signal $V_{in}$ can be converted into an alternating current capable of inducing a deflection force that inherently diminishes with a small interelectrode distances, thus stabilizing the control of the interelectrode distance. This arrangement offers a substantially linear control of interelectrode distance as a function of the control voltage $V_{in}$. A third alternative is that the converter 16 includes a tuned resonant circuit and a frequency-control unit, whereby the interelectrode distance in the sensor 1 is set such that makes the respective electrical resonant frequency of the circuit to be slightly below the actual control frequency. Then, the interelectrode distance can be controlled by altering the control frequency.

Figure 7:
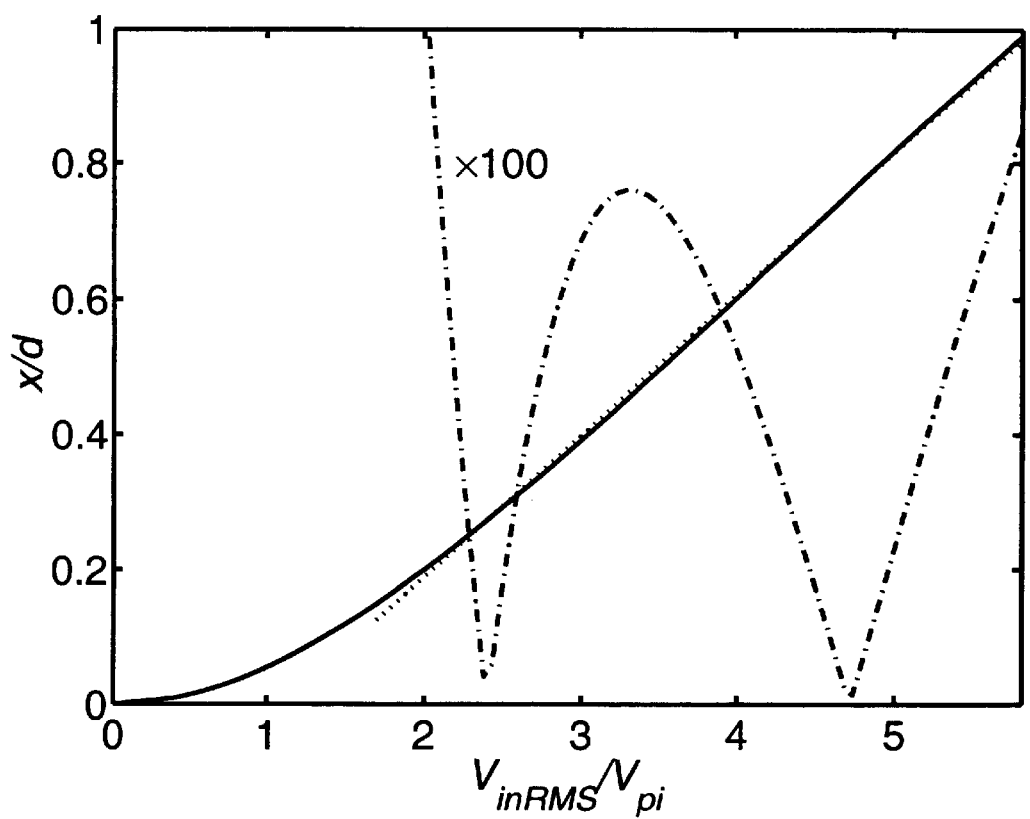
FIG. 7 shows a plot of interelectrode distance as a function of control voltage for constant-frequency operation of a tuning circuit according to the invention.

In FIG. 7 is shown the deflection x of the planar electrode as a function of the control voltage $V_{inRMS}$. The plotted curve is obtained when the control voltage is applied over the resonant circuit with the following parameter values: $\omega/\omega_0 = 1.5$, $\sqrt{L/C_0}/R = 100$ and $C_{stray} = 0$. The linearity of the control function $x(V_{inRMS})$ over the deflection range $0.15 < x < 1$ is $\pm 1.1\%$.

What is claimed is:

1. Method for controlling by electrical means the interelectrode distance of a micromechanical electrode structure (7,8) in which at least one electrode (7) is attached elastically suspended on a surrounding structure, whereby the elastic properties of each electrode and the electrical control applied over the electrodes determine the interelectrode distance, characterized in that the distance between the electrodes (7,8) is controlled by controlling the AC control current passing through the electrodes (7,8) and that the frequency of the AC control current is selected to be higher than a mechanical resonant frequency, calculated using a predetermined algorithm, of the electrode structure (7,8).

2. Method according to claim 1, characterized in that the micromechanical structure is implemented using silicon as at least one of its materials.

3. Method according to claim 1, characterized in that said method is used for controlling the movement of mirrors in a Fabry-Perot interferometer or a Fourier-transform spectrometer or any similar movable mirror.

4. Method according to claim 1, characterized in that a capacitive element (1), forming said micromechanical electrode structure, is connected on a feedback branch of a voltage-to-current converter (2).

5. Method according to claim 1, characterized in that a tuned resonant circuit is formed with said electrodes (7,8) comprising a part thereof and formed by selecting other components of the resonant circuit and the frequency of the control current so that within the control range of the distance between the electrodes (7,8), the electrical resonant frequency of said resonant circuit is smaller than the frequency of the AC control current used.

6. Method according to claim 1, characterized in that a resonant circuit is formed including said electrodes (7,8) as a part thereof and that the frequency of the AC control current is controlled at least substantially close to the resonant frequency of tuned resonant circuit, formed by said electrodes, at any actual distance between the electrodes.

7. Method according to claim 1, characterized in that a resonant circuit is formed and then the frequency of the AC control current is kept at least substantially constant higher than the resonant frequency of said resonant circuit.

8. System for controlling by electrical means the interelectrode distance of a micromechanical electrode structure (7,8) in which at least one electrode (7) is attached elastically suspended on the surrounding structure, whereby the elastic properties of each electrode and the electrical control applied over the electrodes determine the interelectrode distance, said system comprising an alternating current source (15) characterized in that said system includes a converter (16) suitable for converting the output signal of said alternating-current source so that, when said electrodes (7,8) approach each other at a close distance, the voltage applied from said converter over the electrode structure is deviated substantially from the output voltage of the alternating-current source (15) and that said converter (16) is capable of converting the voltage output signal of said alternating-current source (15) into a linear current signal.

9. System for controlling by electrical means the interelectrode distance of a micromechanical electrode structure (7,8) in which at least one electrode (7) is attached elastically suspended on the surrounding structure, whereby the elastic properties of each electrode and the electrical control applied over the electrodes determine the interelectrode distance, said system comprising an alternating current source (15) characterized in that said system includes a converter (16) suitable for converting the output signal of said alternating-current source so that, when said electrodes (7,8) approach each other at a close distance, the voltage applied from said converter over the electrode structure is deviated substantially from the output voltage of the alternating-current source (15) and that said converter comprises a tuning circuit which has said electrode pair (7,8) to be controlled forming a part thereof and whose electrical resonant frequency is smaller than the control frequency used, whereby said system can control the interelectrode distance of said electrode pair (7,8) as an essentially linear function of the output signal amplitude of said alternating-current source.

10. System for controlling by electrical means the interelectrode distance of a micromechanical electrode structure (7,8) in which at least one electrode (7) is attached elastically suspended on the surrounding structure, whereby the elastic properties of each electrode and the electrical control applied over the electrodes determine the interelectrode distance, said system comprising an alternating current source (15) characterized in that said system includes a converter (16) suitable for converting the output signal of said alternating-current source so that, when said electrodes (7,8) approach each other at a close distance, the voltage applied from said converter over the electrode structure is deviated substantially from the output voltage of the alternating-current source (15) and said system having said alternating-current source (15) operating with a substantially constant amplitude, said converter (16) includes a tuned resonant circuit and means for altering the operating frequency of said alternating-current source.

11. System for controlling by electrical means the interelectrode distance of a micromechanical electrode structure (7,8) in which at least one electrode (7) is attached elastically suspended on the surrounding structure, whereby the elastic properties of each electrode and the electrical control applied over the electrodes determine the interelectrode distance, said system comprising an alternating current source (15) characterized in that said system includes a converter (16) suitable for converting the output signal of said alternating-current source so that, when said electrodes (7,8) approach each other at a close distance, the voltage applied from said converter over the electrode structure is deviated substantially from the output voltage of the alternating-current source (15) and that said converter (16) is implemented by connecting the capacitive element (1) to be controlled on the feedback branch of a voltage-to-current converter (2).

12. System according to claim 8, characterized in that said system is adapted to control the movement of mirrors in a Fabry-Perot interferometer or a Fourier-transform spectrometer or any similar movable mirror.

13. System according to claim 1, characterized in that said converter (16) comprises a tuned resonant circuit including said electrode pair (7,8) to be controlled as a part thereof and means for controlling the operating frequency of said alternating-current source (15) so that the frequency of the AC control current is controlled at least substantially close to the resonant frequency of a tuned resonant circuit, formed by said electrodes, at any actual distance between the electrodes.

* * * * *